United States Patent Office 3,535,331
Patented Oct. 20, 1970

3,535,331
WATER-SOLUBLE 2-SUBSTITUTED BENZIMID-
AZOLE HYPOPHOSPHITE SALTS
Edward J. Glamkowski, Plainfield, N.J., assignor to Merck
& Co., Inc., Rahway, N.J., a corporation of New
Jersey
No Drawing. Filed July 26, 1967, Ser. No. 656,013
Int. Cl. C07d 49/38
U.S. Cl. 260—302                3 Claims

ABSTRACT OF THE DISCLOSURE

Water-soluble, nontoxic hypophosphorus acid salts of 2-substituted benzimidazoles are prepared by treating 1 molar equivalent of the benzimidazole with at least 1 molar equivalent of hypophosphorus acid. It is contemplated that dosage units containing the water-soluble, nontoxic benzimidazole hypophosphite salts so produced as the essential active ingredient will be administered in the treatment and control of helminthiasis.

BACKGROUND OF THE INVENTION

Field of the invention

The invention relates to water-soluble salts of certain 2-substituted benzimidazoles and to a method for their preparation. The compounds are benzimidazole hypophosphorus acid salts and are useful as anthelmintics.

Description of the prior art

Certain 2-aryl and 2-heteroaryl benzimidazoles are known in the art, and are known to possess significant anthelmintic activity. The compounds as a class are generally highly insoluble in water, thus limiting the mode of administration to an infected host to specific types of carriers or water suspensions of the benzimidazoles. The purpose of the present invention is to provide a simple and economical means of preparing water-soluble substituted benzimidazoles. The mineral acid salts of the 2-substituted benzimidazoles which have heretofore been prepared, such as the hydrochlorides or phosphates, generally have only limited solubility in water. By the present invention, stable, nontoxic, highly water-soluble salts of certain 2-aryl and 2-heteroaryl benzimidazoles are provided which retain the anthelmintic efficacy of the free bases.

SUMMARY

Novel 2-aryl and 2-heteroaryl benzimidazole hypophosphites, a method of preparing them and compositions containing a novel 2-substituted benzimidazole hypophosphite as the active ingredient are provided. The novel 2-substituted benzimidazole hypophosphites are highly water soluble and retain the anthelmintic potency of the free base.

DESCRIPTION OF THE PREFERRED EMBODIMENTS

The infection known as helminthiasis involves infestation of the body of warm-blooded animals and particularly the gastrointestinal tract of man and domestic animals such as sheep, cattle, goats, swine, dogs, and poultry with certain species of parasitic worms known generally as helminths. Helminthiasis is a disease of major concern when viewed from the aspect of public health and from the aspect of the economic loss resulting from helminthic infestation of domesticated animals. Thus, the provision of improved compositions and methods for the treatment and elimination of helminthiasis, and the parasitic worms responsible for this disease, is most desirable.

Certain 2-substituted benzimidazoles which are known in the art are highly effective anthelmintic agents. The free bases, however, are virtually insoluble in water and, unless utilized in the form of certain of their acid-addition salts, must be used in suspension. Acid-addition salts such as the hydrohalides have been found to give a degree of water-solubility to substituted benzimidazoles, but such solubility is generally in the order of about 1% to a maximum of about 2% by weight of the benzimidazole present. This degree of water solubility is inadequate where, for example, the anthelmintic benzimidazole is to be employed in solution for domestic animals in uniform concentrations suitable for easy ingestion. For practical reasons, solutions used for this purpose generally contain at least one gram of free base per fluid ounce, a concentration of said base in water in excess of 3%. Such solutions of acid-addition salts are not practicable for packaging or transportation, while dissolution of these salts in aqueous medium immediately prior to use is often inconvenient and uniformly slow.

By the present invention, novel compounds are provided which are effective in the treatment, prevention and control of helminthiasis which are nontoxic and which are easily and conveniently administered in uniform concentrations. The compounds are effective in preventing the development of infective eggs and/or larvae of worms, thereby minimizing the possibility of contamination and subsequent reinfestation.

The novel water-soluble benzimidazoles which are the subject of this invention may be depicted as follows:

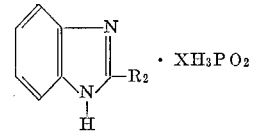

where $R_2$ is a 5-membered heterocyclic radical selected from the group consisting of furyl, pyrryl, thienyl, thiazolyl, isothiazolyl, and thiadiazolyl, or a 6-membered aromatic ring selected from the group consisting of phenyl, halophenyl, and pyridyl; and X is an integer from 1–2.

The novel hypophosphites can be prepared from 2-substituted benzimidazoles which may be substituted on the 6-membered aromatic ring and the N–1 nitrogen of the benzimidazole nucleus.

The 6-membered aromatic ring of the benzimidazole may, if desired, be substituted at a carbon atom with, for example, a loweralkyl radical such as methyl, ethyl, propyl and butyl, a loweralkoxy radical such as methoxy, ethoxy and propoxy, phenyl, halophenyl, phenoxy, halogen, and trifluoroalkyl, such as trifluoromethyl.

The N–1 position of the benzimidazole ring may, if desired, be substituted with, for example, a loweralkyl radical, a loweralkoxy radical or a loweralkenyl radical such as alkyl and methallyl.

Illustrative of the substituted benzimidazole compounds from which the hypophosphite salts can be prepared are:

2-(4'-thiazolyl)-benzimidazole,
2-(3'-thienyl)-benzimidazole,
2-(2'-furyl)-benzimidazole,
2-(2'-pyrryl)-benzimidazole,
1-ethyl-2-(2'-pyrryl)-benzimidazole,
1-allyl-2-(3'-thienyl)-benzimidazole,
2-(2'-thiazolyl)-benzimidazole,
2-(4'-[1',3',4'-thiadiazolyl])-benzimidazole,
5-trifluoromethyl-2-(3'-thienyl)-benzimidazole,
5-phenyl-2-(4'-thiazolyl)-benzimidazole,
1-methyl-2-(2'-furyl)-benzimidazole,
5-chloro-1-methyl-2-(3'-thienyl)benzimidazole,
1-ethyl-2-(2'-thiazolyl)-benzimidazole, 5-ethoxy-2-(3'-thienyl)benzimidazole,
2-phenylbenzimidazole,
2-p-fluorophenyl-benzimidazole,
2-(2'-pyridyl)-benzimidazole,
5-phenyl-2-(4'-isothiazolyl)-benzimidazole,
5-methyl-2-(2'-thiazolyl)-benzimidazole, and
5-chloro-2-(2'-furyl)-benzimidazole.

The novel salts can be prepared by adding approximately 1 molar equivalent of the benzimidazole to about 1 molar equivalent of aqueous solution of hypophosphorus acid. The benzimidazole is generally added in several portions while the entire mixture is stirred vigorously. Although it is preferred to use one molar equivalent of hypophosphorus acid, a slight excess of the acid may also be employed. For convenience, a commercially available 30% aqueous solution of hypophosphorus acid is generally employed, but this concentration is not a critical feature of the invention. A commercially available 50% aqueous solution can also be employed, or the acid can be prepared from sodium hypophosphite by ion exchange. The reaction is generally exothermic, and usually a clear solution remains until the addition of the benzimidazole is complete or nearly complete. The reaction mixture is then stirred vigorously for about 10–30 minutes to ensure complete reaction. Upon standing, the salt generally settles out of solution as a paste-like mass which is first cooled to about 10° C. and is then collected by filtration or other known techniques. The paste-like mass can be thinned out with a small volume of a water-soluble solvent such as acetone, ethanol, dioxane, tetrahydrofuran, or dimethylformamide, to aid in the filtration process. The salt is generally washed well with acetone, cold ethanol, or some other solvent in which the salt is insoluble.

In addition to water, the reaction may be carried out in a water-soluble solvent such as ethanol or propanol. Because of the increased solubility of the product salt in such a solvent, better yields are obtained when the solvent is essentially completely removed before the salt is collected.

The product is generally crystalline and is essentially pure, requiring little or no further purification. However, the salt can be recrystallized by dissolving it in a small volume of a warm solvent such as alcohol or ethyl acetate and chilling the solution before filtration. The yield of hypophosphite obtained by this procedure is generally good; yields as high as 83% have been obtained. Where a quantitative yield is desired, one can add sufficient water to the reaction mixture to dissolve the precipitated salt and then freeze-dry the entire solution. In addition to elemental analysis, the purity of the solid is generally determined by ultraviolet spectra in water, using the corresponding hydrochloride salt of the benzimidazole as a reference compound.

The novel hypophosphites are unexpectedly highly water soluble, e.g., the solubility of the hypophosphite salt of 2-(4'-thiazolyl)-benzimidazole is calculated at about 34% by weight. The content of the benzimidazole in the latter compound is about 26% by weight. This high degree of solubility is unexpected in view of the fact that the known salts of these benzimidazoles, such as the hydrochlorides and phosphates, have only limited solubility in water, generally of the order of about 1–3% by weight of the benzimidazole present.

A more soluble salt can be prepared by using about 2 molar equivalents of hypophosphorus acid instead of 1 molar equivalent. In this instance a dihypophosphite is obtained which is also highly water soluble. For example, the solubility of the dihypophosphite salt of 2-(4'-thiazolyl)-benzimidazole is calculated at about 54% by weight. The content of the benzimidazole in the latter compound is about 32% by weight.

While preferably used in aqueous solutions, the salts of the invention may be employed in solvents such as propylene glycol, dimethyl sulfoxide and dimethylformamide or they may be employed therapeutically in the form of a capsule, tablet, or bolus.

The salts can also be prepared as dry powders which can be stored and transported as such, and which can be conveniently dissolved in solution when desired.

Because of the high solubility in water, the substituted benzimidazole salts can be administered orally, but parenteral, intramuscular, and subcutaneous administration are also contemplated.

Where oral administration is employed, the salt can be added to the drinking water just before use, or a drench formulation can be prepared in advance which may be diluted up to the desired concentration at the time of use. Where practicable, the salt need not be isolated from the original reaction solvent before use. A sufficient amount of the solvent may be added to bring the salt entirely into solution and the appropriate concentration can then be administered to the infected host. In such cases, equimolar amounts of the benzimidazole and hypophosphorus acid are employed to avoid any excess of unreacted starting material. Generally, a dosage rate of about 30–50 mg. of benzimidazole per kilogram of animal body weight is employed. In the drench preparations, concentrations of about 10%–40% wt./vol. may be employed. The exact percentage used will depend upon the dosage level required and the limitation imposed on the volume to be administered.

The following results with sheep were obtained using 2-(4'-thiazolyl)-benzimidazole hypophosphite in the form of a drenching solution. The extent of infection was compared at necropsy with infected controls. The drenching solution was administered orally.

| Species | Solvent | Dose rate, mg./kg. | Percent reduction |
| --- | --- | --- | --- |
| Cooperia | Water | 44 | 98 |
| Nematodirus | do | 44 | 98 |
| Ostertagia | do | 44 | 97 |
| Strongyloides | do | 44 | >98 |
| Trichostrongylus | do | 44 | >99 |

When administered in powdered form, the benzimidazole hypophosphite salt may be dispersed in or admixed with standard elements of animal sustenance, such as feed, or other orally ingestible carriers, such as distillers' dried grains, corn meal, alfalfa, ground oyster shells, molasses solubles, corn cob meal, and the like. This method is usually employed when it is desired to administer the compounds either as therapeutic or prophylactic agents over an extended period.

When the salt is employed in the form of a capsule, tablet, or bolus, the compound can be administered orally in a unit dosage form wherein the compounds may be blended with one or more innocuous orally ingestible excipients including diluents, fillers, binders, lubricants, disintegrating agents, and similar standard formulations. Enteric vehicles and compositions particularly useful for the treatment of animals suffering from severe helminthic infection of the intestinal tract can also be employed.

The proportion of active ingredients in the above media of administration may vary widely depending upon the desired dosage sought to be administered to the infected host. Thus, tablets, boluses and the like, whether enteric in nature or not, can incorporate, for example, from about 5% to about 70% of the anthelmintic agent measured on the basis of the weight of the benzimidazole component of the salt.

Such procedures as outlines above involve the possibility of irregular concentrations of the anthelmintic agent as well as other difficulties and disadvantages which are readily avoided by use of these compounds in the preferred form of their aqueous solutions.

The following examples are given for the purpose of illustration and not by way of limitation:

EXAMPLE 1

2-(4'-thiazolyl)-benzimidazole hypophosphite 144 ml. (0.66 mole) of hypophosphorus acid (30% aqueous solution) are placed in a 1-liter beaker equipped with a mechanical stirrer. To this is added in portions 120.8 grams (0.60 mole) of 2-(4'-thiazolyl)-benzimidazole with vigorous stirring during 15 minutes. The reaction temperature rises from 22°–36° C., and a thick slurry remains at the end of the addition of the benzimidazole. After standing 10 minutes, the salt separates as a paste-like mass. The mixture is then cooled in an ice bath to 10° C., and 100 ml. of acetone are added, after which the mixture is stirred an additional 15 minutes at 10° C. The salt is collected by filtration, washed well with acetone, and, after drying to constant weight in vacuo at 50°–60° C., 134.7 g. (83%) of 2-(4'-thiazolyl)-benzimidazole hypophosphite, M.P. 178°–179.5° C., are obtained. The product analyzed for $C_{10}H_{10}N_3O_2PS$.

To obtain a quantitative yield of the salt, the above procedure is followed up to the addition of the benzimidazole. At this point, sufficient water is added to dissolve the salt and the solution is freeze-dried to yield 159 grams of essentially pure 2-(4'-thiazolyl)-benzimidazole hypophosphite.

EXAMPLE 2

2-(4'-thiazolyl)-benzimidazole dihypophosphite 7.92 grams (0.06 mole $H_3PO_2$) of 50% aqueous hypophosphorus acid are placed in a 500 ml. round-bottom flask, and to this is added a slurry of 16.04 grams (0.03 mole) of 2-(4'-thiazolyl)-benzimidazole in 10 ml. of distilled water with stirring. The solid dissolves within 5 minutes, after which the entire solution is freeze-dried. The resulting crude solid is then dried in vacuo at 50° C. for 15 hours; weight after drying, 11.10 grams. Upon recrystallization of 2 grams of the crude product from chloroform, 1.57 grams of essentially pure 2-(4'-thiazolyl)-benzimidazole dihypophosphite, M.P. 114° C. dec., are obtained. The neutralization equivalent corresponds to $C_{10}H_7N_3S \cdot 2H_3PO_2$.

When in the above procedure 2-(2'-pyrryl)-benzimidazole, 2-(2'-thiazolyl)-benzimidazole, and 2-(2'-furyl)-benzimidazole are employed in place of 2-(4'-thiazolyl)-benzimidazole, there are obtained 2-(2'-pyrryl)-benzimidazole-dihypophosphite, 2-(2'-thiazolyl)-benzimidazole dihypophosphite, and 2-(2'-furyl)-benzimidazole dihypophosphite, respectively.

EXAMPLE 3

2-(3'-thienyl)-benzimidazole hypophosphite 20 grams (0.1 mole) of 2-(3'-thienyl)-benzimidazole are added in portions to 24 ml. (0.11 mole) of hypophosphorus acid (30% aqueous solution) in a 250 ml. beaker equipped with a mechanical stirrer. The mixture is stirred vigorously during the addition of the benzimidazole. The reaction temperature rises from 20°–35° C., and a thick slurry remains at the end of the addition of the benzimidazole. After standing 15 minutes, the salt separates as a paste-like mass. The mixture is cooled in an ice bath to 10° C., and 25 ml. of acetone are added, after which the mixture is stirred an additional 15 minutes at 10° C. The salt is collected by filtration, washed well with acetone and, after drying to constant weight in vacuo, at 55°–60° C., essentially pure 2-(3'-thienyl)-benzimidazole hypophosphite is obtained.

When in the above procedure 2-(2'-pyrryl)-benzimidazole, 2-(2'-thiazolyl)-benzimidazole, and 2-(2'-furyl)-benzimidazole are employed in place of 2-(3'-thienyl)-benzimidazole, there are obtained 2-(2'-pyrryl)-benzimidazole hypophosphite, 2-(2'-thiazolyl)-benzimidazole hypophosphite, and 2-(2'-furyl)-benzimidazole hypophosphite, respectively.

EXAMPLE 4

2-(3'-thienyl)-benzimidazole dihypophosphite 48 ml. (0.20 mole) of hypophosphorus acid are placed in a 250 ml. flask, and to this is added with stirring a slurry of 20 grams (0.10 mole) of 2-(3'-thienyl)-benzimidazole in 12 ml. of distilled water. The solid dissolves within 5 minutes, and the entire solution is freeze-dried. The resulting crude solid is then dried in vacuo at 55° C. for 12 hours, yielding essentially pure 2-(3'-thienyl)-benzimidazole dihypophosphite.

When in the above procedure 2-(2'-pyrryl)-benzimidazole, 2-(2'-thiazolyl)-benzimidazole, and 2-(2'-furyl)-benzimidazole are used in place of 1-(3'-thienyl)-benzimidazole, there are obtained 2-(2'-pyrryl)-benzimidazole dihypophosphite, 2-(2'-thiazolyl)-benzimidazole dihypophosphite, and 2-(2'-furyl)-benzimidazole dihypophosphite, respectively.

EXAMPLE 5

5-methyl-2-(2'-thiazolyl)-benzimidazole hypophosphite 24 ml. (0.11 mole) of hypophosphorus acid (30% aqueous solution) are placed in a ½-liter beaker equipped with a mechanical stirrer. To this is added in portions 28.7 grams (0.1 mole) of 5-methyl-2-(2'-thiazolyl)-benzimidazole with vigorous stirring during 15 minutes. The reaction temperature rises from 21°–35° C., and a thick slurry remains. After the addition of the benzimidazole is complete, the solution is allowed to stand for 10 minutes, after which the solid separates as a paste-like mass. The mixture is cooled in an ice bath to 12° C., and 30 ml. of acetone are added, after which the mixture is stirred an additional 15 minutes at 10° C. The salt is collected by filtration, washed well with acetone, and after drying to a constant weight in vacuo at 50°–55° C., essentially pure 5-methyl-2-(2'-thiazolyl)-benzimidazole hypophosphite is obtained.

When in the above procedure 1-ethyl-2-(2'-pyrryl)-benzimidazole,
1-allyl-2-(3'-thienyl)-benzimidazole,
5-phenyl-2-(4'-thiazolyl)-benzimidazole, and
5-ethoxy-2-(3'-thienyl)-benzimidazole are employed in place of 5-methyl-2-(2'-thiazolyl)-benzimidazole, there are obtained 1-ethyl-2-(2'-pyrryl)-benzimidazole hypophosphite,
1-allyl-2-(3'-thienyl)-benzimidazole hypophosphite,
5-phenyl-2-(4'-thiazolyl) - benzimidazole hypophosphite, and
5-ethoxy-2-(3'-thienyl)-benzimidazole hypophosphite, respectively.

EXAMPLE 6

5-methyl-2-(2'-thiazolyl)-benzimidazole dihypophosphite 48 ml. (0.02 mole) of hypophosphorus acid are placed in a 250 ml. round-bottom flask, and to this is added with stirring a slurry of 28.7 grams (0.10 mole) of 5-methyl-2-(2'-thiazolyl)-benzimidazole in 10 ml. of distilled water. The solid dissolves within 5 minutes, and the resulting solution is freeze-dried. The crude solid is dried in vacuo at 55° C. for 15 hours, yielding essentially pure 5-methyl-2-(2'-thiazolyl)-benzimidazole dihypophosphite.

When in the above procedure 1-ethyl-2-(2'-pyrryl)-benzimidazole, 1-allyl-2-(3'-thienyl) - benzimidazole, 5-phenyl-2-(4'-thiazolyl)-benzimidazole, and 5-ethoxy-2-(3'-thienyl)-benzimidazole are employed in place of 5-methyl-2-(2'-thiazolyl)-benzimidazole, there are obtained 1-ethyl-2-(2'-pyrryl)-benzimidazole dihypophosphite, 1-ethyl - 2 - (3' - thienyl) - benzimidazole dihypophosphite, 5-phenyl-2-(4'-thiazolyl)-benzimidazole dihypophosphite, and 5-ethoxy-2-(3'-thienyl) - benzimidazole dihypophosphite, respectively.

It should be understood that although this invention has been described with reference to particular embodi-

What is claimed is:
1. A 2-substituted benzimidazole hypophosphite acid addition salt wherein the substituent at the 2-position is a radical selected from the class consisting of furyl, pyrryl, thienyl, thiazolyl, isothiazolyl, thiadiazolyl, phenyl, halophenyl and pyridyl radicals.
2. The compound of claim 1 wherein the substituent at the 2-position is a radical selected from the group consisting of thiazolyl, isothiazolyl, and thiadiazolyl.
3. The compound of claim 1 wherein the substituent at the 2-position is 4'-thiazolyl.

References Cited

UNITED STATES PATENTS 3,017,415  1/1962  Sarett et al. _____ 260—302

OTHER REFERENCES

Polgar: Chem. Abstracts, 66:88637j (May 1967).

ALEX MAZEL, Primary Examiner

R. J. GALLAGHER, Assistant Examiner

U.S. Cl. X.R.

260—296; 424—199